United States Patent
Allerding et al.

(10) Patent No.: US 7,483,779 B2
(45) Date of Patent: Jan. 27, 2009

(54) METHOD FOR THE ADJUSTMENT OF THE CONTROL CURRENT OF CURRENT-CONTROLLED HYDRAULIC VALVES

(75) Inventors: Uwe Allerding, Ehbsen (DE); Matthias Düwel, Hamburg (DE); Thomas Stolten, Tremsbüttel (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 201 days.

(21) Appl. No.: 11/050,658

(22) Filed: Feb. 3, 2005

(65) Prior Publication Data

US 2005/0171668 A1 Aug. 4, 2005

(30) Foreign Application Priority Data

Feb. 3, 2004 (DE) ........................ 10 2004 005 401

(51) Int. Cl.
G06F 7/70 (2006.01)
(52) U.S. Cl. ..................................... 701/50; 251/129.08
(58) Field of Classification Search .................. 701/50; 702/33, 38, 64, 65; 73/1.16, 1.73, 116.02; 477/119; 475/127; 251/5, 12, 30.01, 58, 251/129.01, 290, 129.08
See application file for complete search history.

(56) References Cited

U.S. PATENT DOCUMENTS 5,285,715 A 2/1994 Elrod, Jr. et al. ........ 137/625.64

(Continued)

FOREIGN PATENT DOCUMENTS

| DE | 4423102 | 1/1996 |
| DE | 60006881 A2 * | 3/2000 |
| DE | 60006881 T2 * | 3/2000 |
| DE | 60 00 68 81 D2 | 10/2004 |
| EP | 1 041 329 B1 | 12/2003 |

OTHER PUBLICATIONS

Vendio.com—http://imagehost.vendio.com/bin/viewimage.x/00000000/hayekfa/DSC03387.JPG?vvid=39540390&sp=1.*

(Continued)

*Primary Examiner*—Khoi H. Tran
*Assistant Examiner*—Jonathan Goldfarb
(74) *Attorney, Agent, or Firm*—Vidas, Arrett & Steinkraus, P.A.

(57) ABSTRACT

Method for the adjustment of a control current of current-controlled, hysteresis-affected hydraulic valves for the actuation of individual hydraulic functions of industrial trucks, the control current being generated in an electronic control device according to a manually pre-set transmitter signal, characterised by the following steps for each hydraulic function which is controlled by a hydraulic valve, an average characteristic line $I=f(Q)$ is determined by experiments or via calculation, in which I is the control current and Q is the volume flux of the hydraulic medium flowing through the hydraulic valve, the specific characteristic line $I_{res}=f(Q)$ is measured for each individual hydraulic valve, and a first average control current value for a predetermined volume flux value is determined from the characteristic line values, between the first average control current value and a second average control current value, which is derived from the determined characteristic line $I=f(Q)$ at the pre-set volume flux value, the difference is formed and a constant is added, and the control current correction value thus determined is attached to the case of the individual hydraulic valve as a code, upon assembly of the hydraulic valve, the code is read out and memorised into the control device, for the purpose of correction of the respective control current, when the hydraulic function is triggered, for the control current correction value according to the characteristic line $I=f(Q)$ laid down in the control device.

4 Claims, 2 Drawing Sheets

U.S. PATENT DOCUMENTS

| | | | | |
|---|---|---|---|---|
| 5,301,128 | A | * | 4/1994 | Bybee .......................... 702/83 |
| 5,448,499 | A | * | 9/1995 | Palmer ....................... 700/266 |
| 6,631,651 | B2 | * | 10/2003 | Petrzik ....................... 74/346 |
| 2002/0069916 | A1 | | 6/2002 | Ferguson et al. ......... 137/487.5 |
| 2004/0237638 | A1 | * | 12/2004 | Reviol et al. .................. 73/121 |
| 2005/0104601 | A1 | * | 5/2005 | Engelmann et al. ......... 324/522 |

OTHER PUBLICATIONS

Vendio.com—http://imagehost.vendio.com/bin/viewimage.x/00000000/hayekfa/DSC03387.JPG?vvid=39540390&sp=1.*

* cited by examiner

METHOD FOR THE ADJUSTMENT OF THE CONTROL CURRENT OF CURRENT-CONTROLLED HYDRAULIC VALVES

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a method for adjustment of the control current of current-controlled hydraulic valves for the actuation of individual hydraulic functions of industrial trucks, according to the preamble of patent claim 1.

With industrial trucks it is known to actuate a number of functions in a hydraulic manner. To these belong the lifting and lowering of a hoisting device, the displacement of a lifting bench in a reach mast truck, the tilting of the lifting bench and, occasionally, the displacement of the hoisting device in a lateral direction. To each function belongs at least one hydraulic adjustment cylinder, and the triggering of the adjustment cylinder takes place with the aid of a hydraulic valve. Upon opening of the valve, the actuated part moves with a predetermined speed, which of course, a predetermined pressure being assumed, depends upon the opening cross section. As is well known, the opening cross section of the valve is adjusted by a pre-controlling device, e.g. an electromagnet. Thus, the control current at the electromagnet determines the effective cross section.

According to lifting height, vehicle type and so on, the speed at which the hydraulically actuated part is moved has to be adjusted in an appropriate manner. The control current for the respective valves is generated with the aid of an electronic control device, which on its part receives a transmitter signal from an operator's control or the like, which is manually actuated, e.g. By reason of not avoidable work tolerances, different function speeds result on the valve at a predetermined control current. It is therefore known to calibrate each valve before it is brought to operation, with the aid of an on-board computer of the industrial truck. The control current for the triggering of the electromagnet is manually corrected. Such a procedure is time-consuming and can result in incorrect adjustments.

The invention has therefore the objective to specify a method for the adjustment of the control current of current-controlled hydraulic valves for the actuation of individual hydraulic functions of industrial trucks, which can be performed more rapidly and more simply.

BRIEF SUMMARY OF THE INVENTION

In the method according to the invention, for each hydraulic function which is controlled by a valve, an average characteristic line for the control current of the valve, in dependence of the volume flux, is determined by experiments or via calculation. Such a procedure can take place at the manufacturer of the hydraulic valves, a statistical number of valves being measured. It is also customary that the manufacturer of valves measures each individual valve and determines the volume flux in dependence from the electrical current, before distribution to the customer. Because of the existing hysteresis, the currents are measured at increasing and at decreasing values. In the method according to the invention, an average control current value is determined for each valve from the specific values of the characteristic line. For instance, an average control current value is formed at half the nominal volume flux. From the averaged control current value, the deviation with respect to the characteristic line, which has already been statistically determined, can be established. From this, the typical average current value may be determined for half the nominal volume flux, e.g. The correction value for an individual valve results from the difference of the determined control current values, plus an added constant to avoid negative values. In the case that negative values can be encoded too, the constant might also be zero. The correction value is attached to the valve as a code, a barcode for instance. Upon the assembly of the valve, the correction value can be memorised into the control device with the aid of an appropriate code reader, a barcode scanner e.g. In the control device, the already mentioned average characteristic line is laid down. In operation, it is then required to alter the control current, which is generated by the operator via a transmitter in the control device, for the already mentioned correction value, which then takes place automatically in the control device.

The method according to the invention is based on the finding that, with otherwise equal hydraulic valves of a particular construction, the course of the characteristic line is approximately similar, and tolerances between the valves do result only in a displacement of the characteristic line in the characteristic line diagram. In other words, the achievable volume flux values at particular control current values vary with individual valves, or otherwise expressed, a specified volume flux is obtained for equally dimensioned valves with different control current values. Through the fact that, according to the method of the invention, the hydraulic valve is trimmed with respect to the control current, always equal behaviour, with respect to its hydraulic functions, results for different industrial trucks.

The method according to the invention has the advantage that the valve adjustment takes place almost completely automatically, thus the time expenditure upon assembly is significantly reduced. An additional advantage is that uniform function speeds can be established. As an incorrect valve adjustment may lead to unnecessarily high energy consumption, the method according to the invention permits also an energy saving.

$$I(Q/2)_{res} = \frac{I(Q/2)_1 + I(Q/2)_2}{2} \quad [mA]$$

In the same way, a typical current value at Q/2 can be determined from the characteristic line I=f(Q), which had already been established statistically or by calculation before. The correction value $I_{Prop}$ then results from the following formula:

$$I_{Prop}=I(Q/2)_{res}-I(Q/2)_{typ}+k,$$

wherein k is a constant. The current correction value is laid down in the software of the electronic control device after the assembly of the valve, together with the already mentioned average characteristic line I/f(Q). In operation, the control current for the respective valve results from the formula:

$$I_{res}=f(Q)+(I_{Prop}-k)$$

In this way, it is possible to perform a relatively accurate and reproducible adjustment for each valve of a control block in an industrial truck, which furthermore takes place in a rapid manner.

Figure 2:
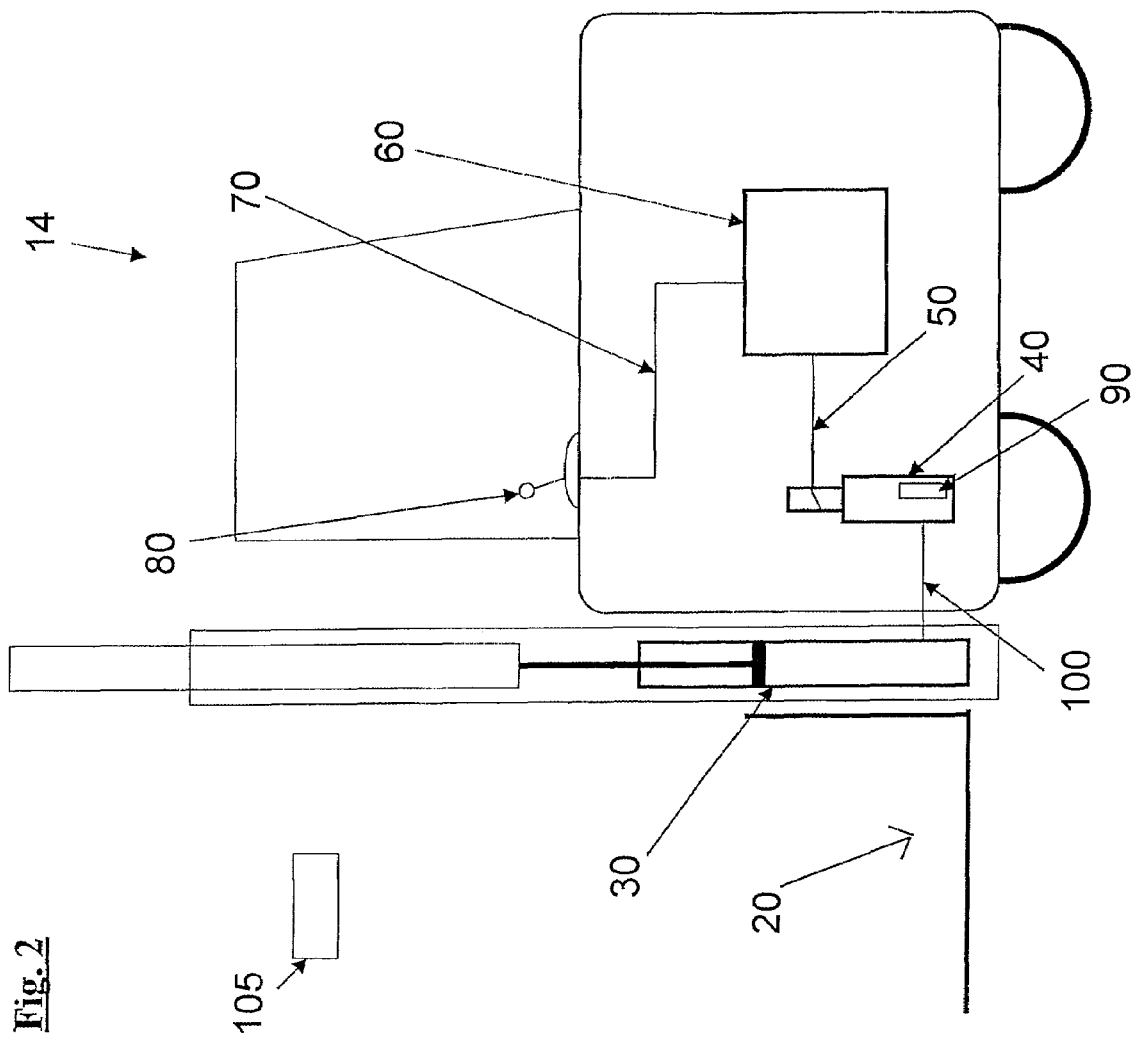

FIG. 2 shows an industrial truck 14 is shown having a lifting device 20 that is moved when acted upon by at least one hydraulic cylinder 30.

Figure 1:
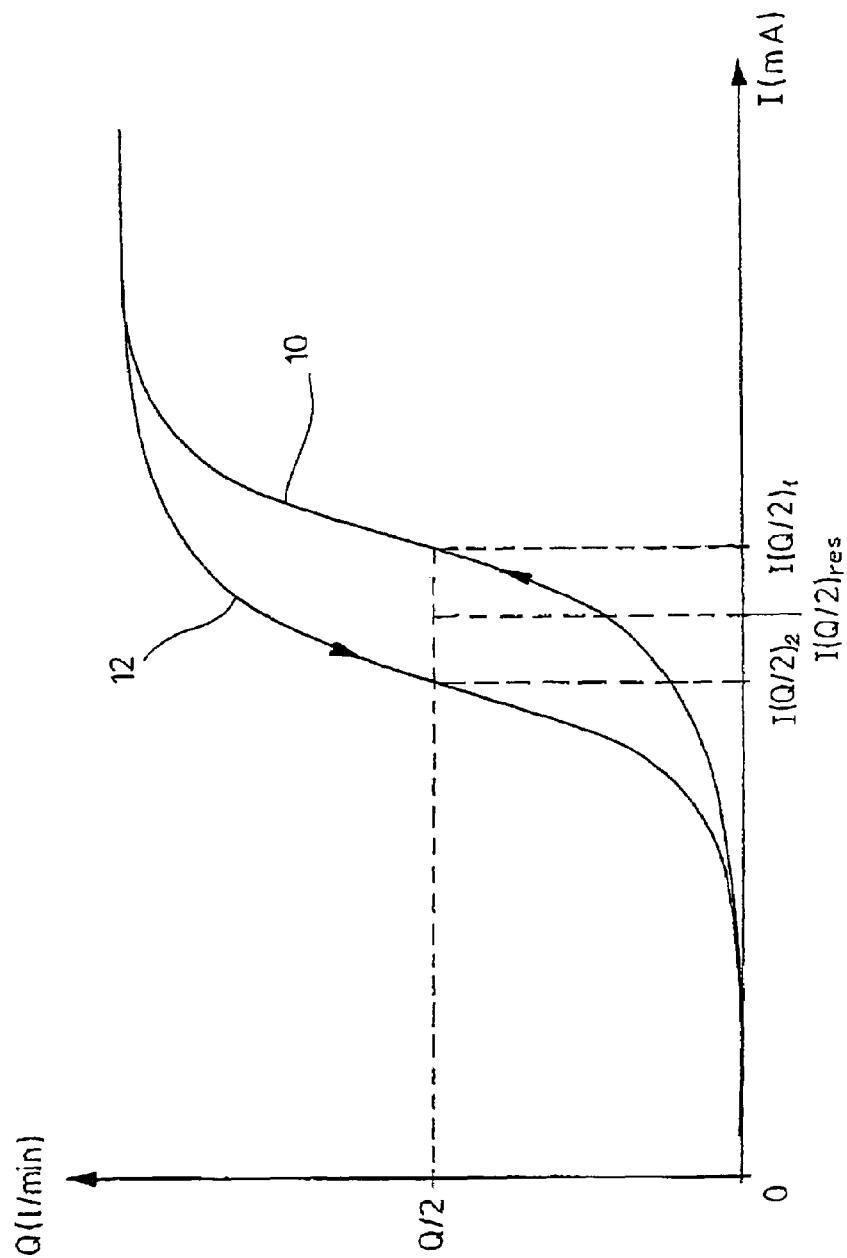
In FIG. 1, the course of a characteristic line for a particular valve is represented. The volume flux through the valve is plotted on the ordinate and the control current is plotted on the abscissa. One recognises that upon increasing control current, the branch 10 has another course than upon decreasing control current (branch 12). Thus, there is a hysteresis. In the method according to the invention, an average current value is now calculated, e.g. for half the nominal volume flux Q/2, from the formula.
Figure 3:
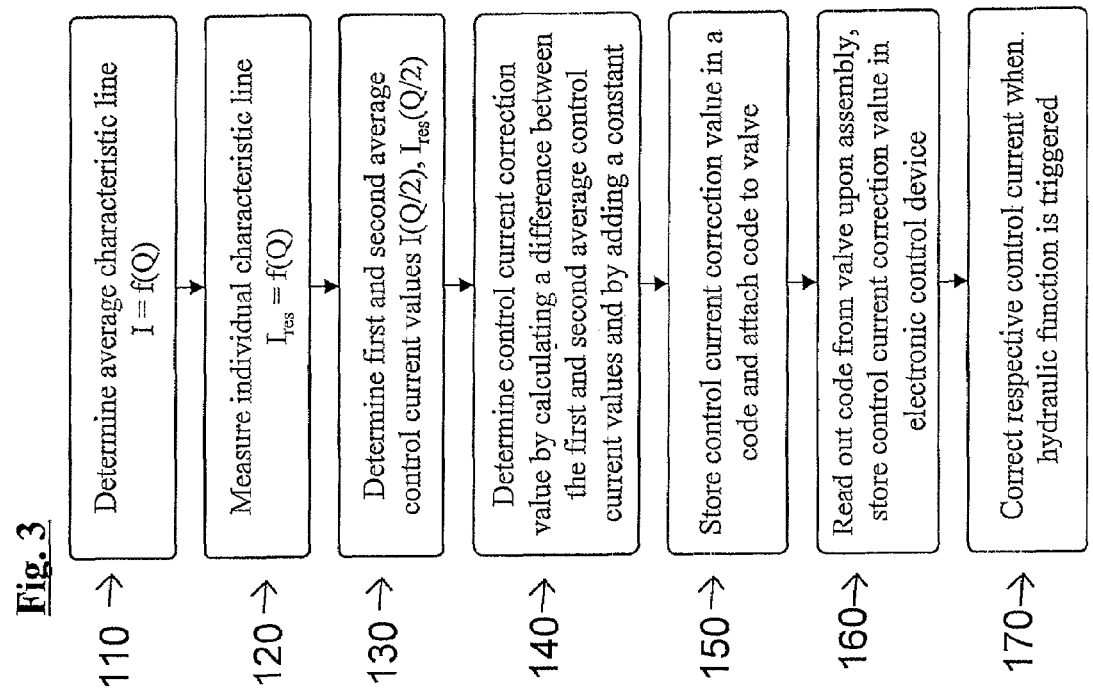

FIG. 3 shows a flow diagram of an inventive method for the adjustment of the control current of current-controlled hydraulic valves

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

When the characteristic line of the valve has a strongly progressive course, it is convenient to establish the correction value for a volume flux which is smaller than Q/2.

In FIG. 2 an industrial truck 14 is shown having a lifting device 20 that is moved when acted upon by at least one hydraulic cylinder 30. The hydraulic cylinder is actuated by the hydraulic valve 40. Upon opening the valve, the actuated part moves with a predetermined speed and with a predetermined pressure being assumed dependent on the opening cross-section.

Dependent upon lifting height, vehicle type and so on, the speed at which the hydraulically actuated part is moved has to be adjusted in an appropriate manner. A control current 50 for the respective valves is generated by an electronic control device 60. The electronic control device receives a transmitter signal 70 from an operator's control 80. The operator's control can be manually actuated.

Due to manufacturing variance, the valves 40 can have different function speeds at a predetermined control current. Each valve 40 has attached thereto a code 90 (e.g. barcode) with a correction value. The hydraulic valve 40 creates a volume flux Q of hydraulic medium 100 that actuates the cylinder 30. The correction value can be stored in the control device with the aid of a code reader 105 (e.g. barcode scanner).

In the flow diagram of FIG. 3 an inventive method for the adjustment of the control current of current-controlled hydraulic valves is illustrated. As illustrated, a first step 110 determines an average characteristic line for the control current of the valve 40. The line can be determined by experiments or via calculation. It can also be determined independent of the volume flux. This procedure can take place at the manufacturer of the hydraulic valves as a statistical number of valves can be measured.

A second step 120 measures the individual characteristic line for the individual valve. The flux (Q) 100 can be determined independent from the electrical current I.

A third step 130 determines first and second average control current values $I(Q/2)$, $I_{res}(Q/2)$. This can be determined by finding the average of the current for both sides of the hysteresis when half the nominal flux is flowing.

A fourth step 140 determines the control current correction value by calculating a difference between the first and second average control current values and by adding a constant. The constant may be added to avoid negative values.

A fifth step 150 stores the control current correction value in a code and attaches it to a valve 40. The code can be a bar code.

A sixth step 160 reads the code of the control current correction value upon assembly and stores it in an electronic control device 60 of the industrial truck 10. The control device already has stored therein the average characteristic line mentioned in the first step. A code reader 105 such as a bar code scanner may be used to read the code.

A seventh step 170 during operation of the industrial truck corrects the respective control current when hydraulic function is triggered. The control current signal 70 can be generated by the truck's operator via a transmitter 80.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. Method for the adjustment of a control current of current-controlled, hysteresis-affected hydraulic valves for the actuation of individual hydraulic functions of industrial trucks, the control current being generated in an electronic control device according to a manually pre-set transmitter signal, comprising:

determining by experiments or via calculation an average characteristic line I=f(Q) for each hydraulic function which is controlled by a hydraulic valve, I is the control current and Q is the volume flux of the hydraulic medium flowing through the hydraulic valve, measuring the specific characteristic line $I_{res}=f(Q)$ for each individual hydraulic valve, determining from the characteristic line values a first average control current value for a predetermined volume flux value, deriving a second average control current value from the determined characteristic line $I=f(Q)$ at the predetermined volume flux value, determining an individual control current correction value by calculating a difference between the first average control current value and the second average control current value, storing the control current correction value to the individual hydraulic valve as a code, reading out the code upon assembly of the hydraulic valve, storing the code into the control device, correcting the respective control current when the hydraulic function is triggered using the control current correction value according to the characteristic line $I=f(Q)$ laid down in the control device.

2. Method according to claim 1, wherein the first and/or second average control current value are determined at half the volume flux of the valve.

3. Method according to claim 1, wherein the first and/or second average control current value are determined at a volume flux value less than half of the volume flux of the valve.

4. Method according to claim 1, characterised in that the current correction value is attached to the valve case as a barcode and is read out by means of a barcode scanner.

* * * * *